April 15, 1952    H. F. CLARK    2,593,268
SINGLE-PHASE MOTOR CONTROL
Filed July 20, 1948    7 Sheets-Sheet 1

INVENTOR.
Harry F Clark
BY
Spencer Hardman and Fehr
Attorneys

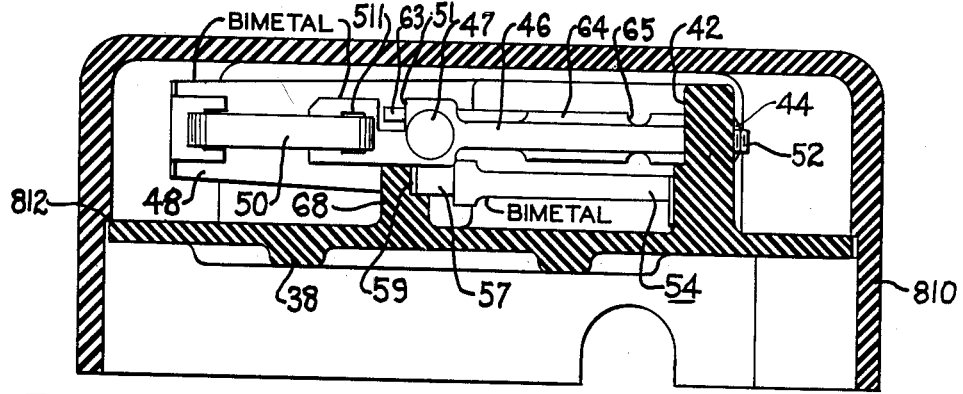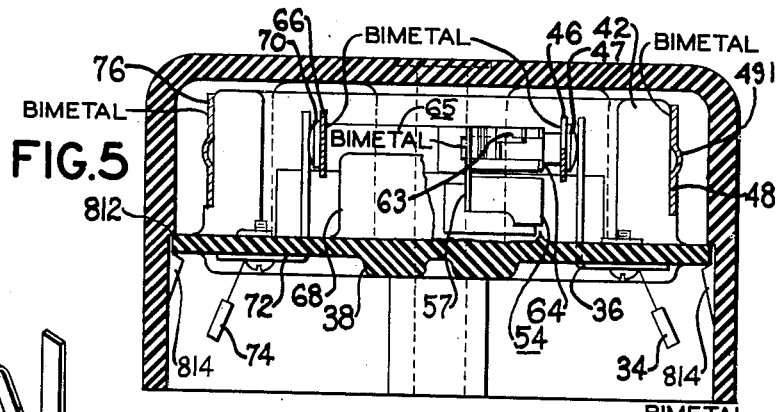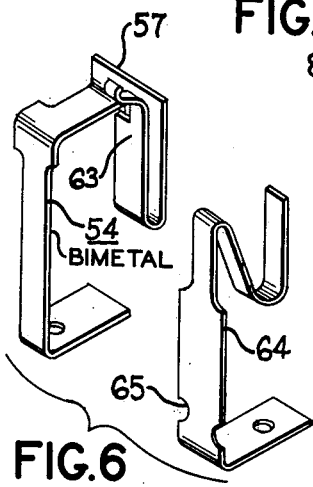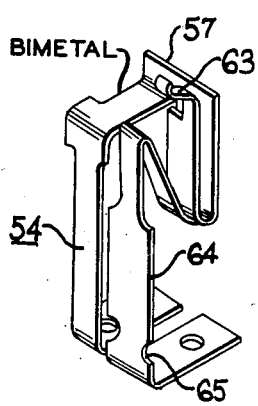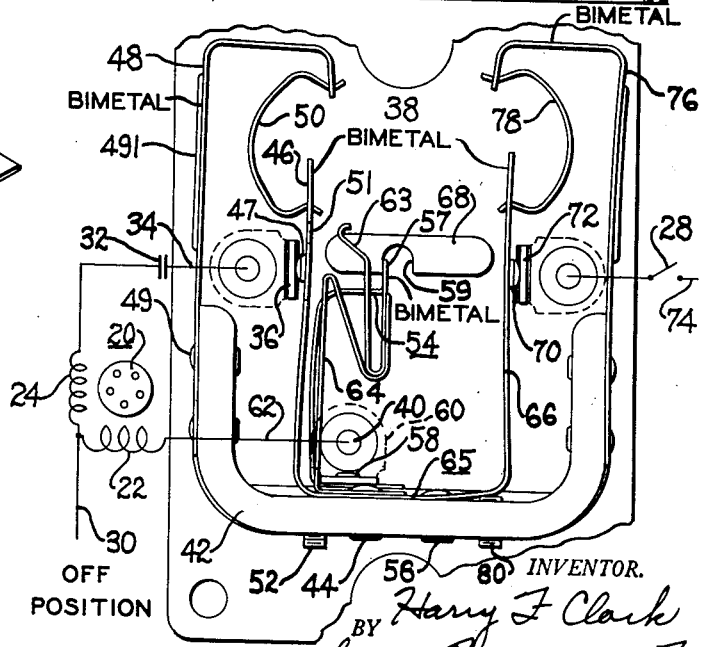

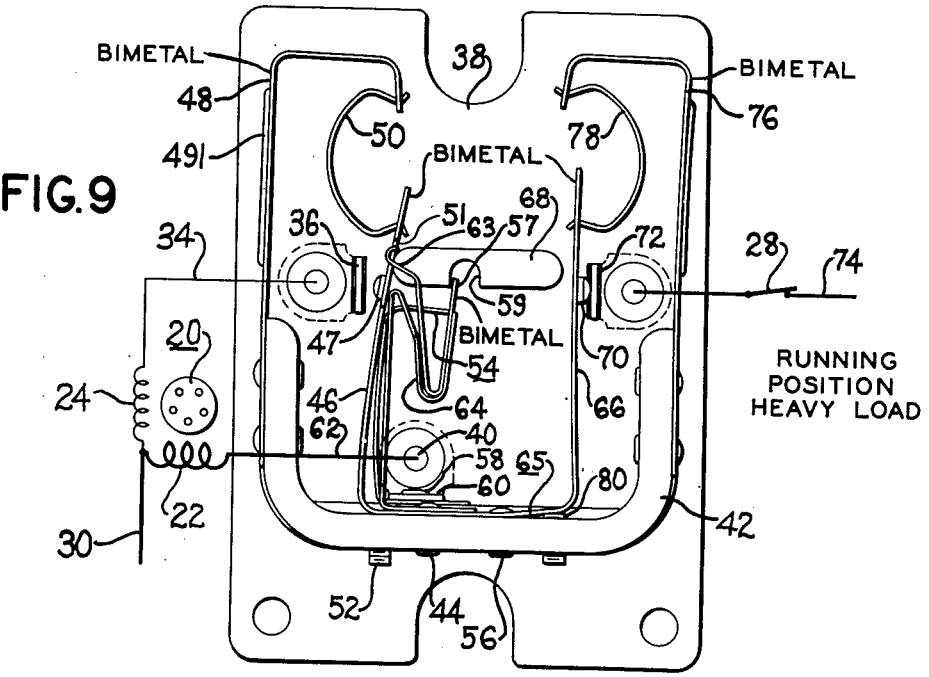
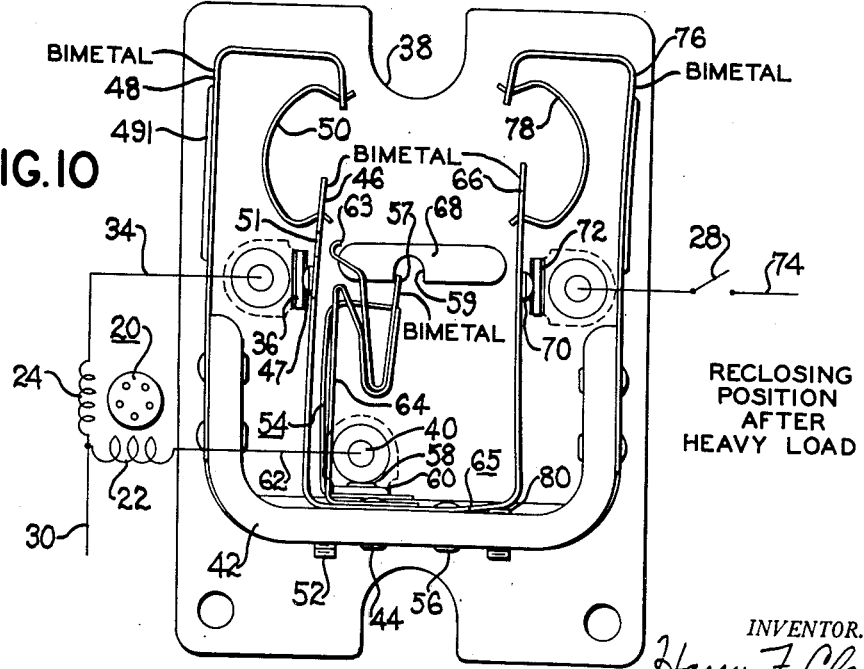

April 15, 1952  H. F. CLARK  2,593,268
SINGLE-PHASE MOTOR CONTROL
Filed July 20, 1948  7 Sheets-Sheet 4

STALL POSITION
BEFORE O.L. TRIPS

STALL POSITION
AFTER O.L. TRIPS

INVENTOR.
Harry F. Clark
BY Spencer Hardman and Fehr
Attorneys

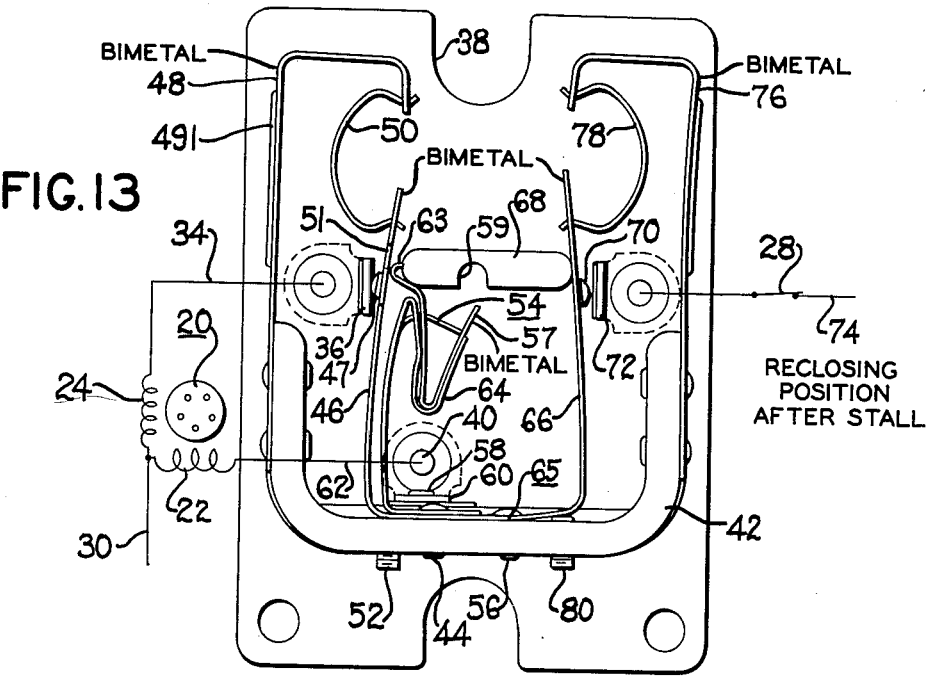
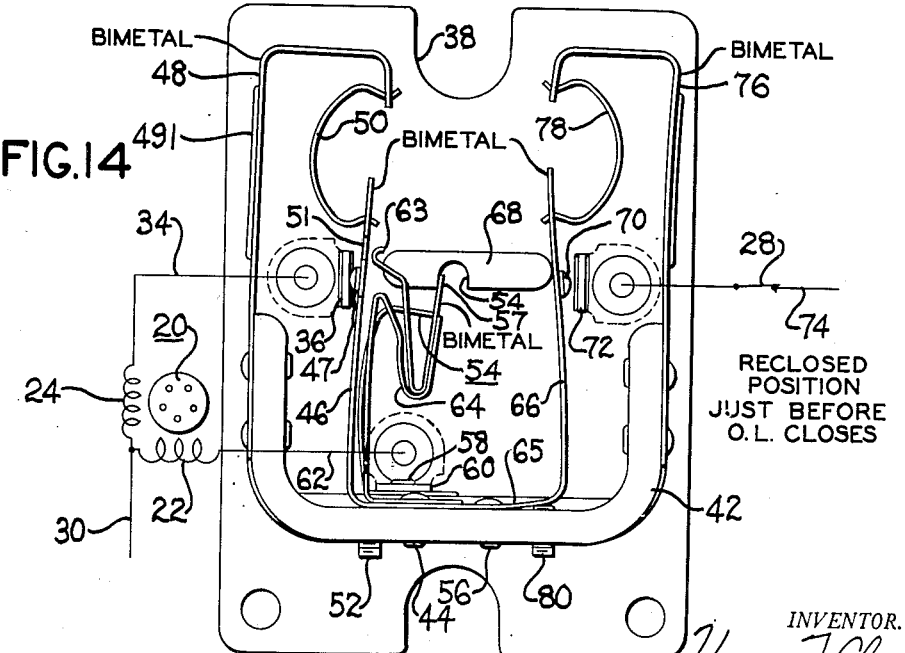

April 15, 1952     H. F. CLARK     2,593,268
SINGLE-PHASE MOTOR CONTROL
Filed July 20, 1948     7 Sheets-Sheet 6
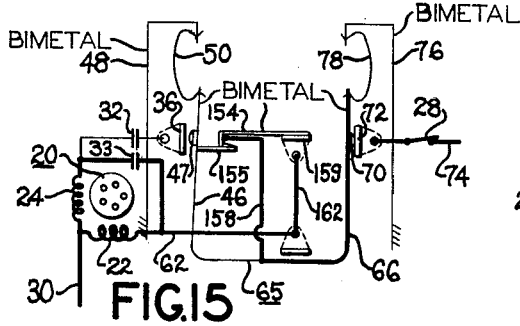
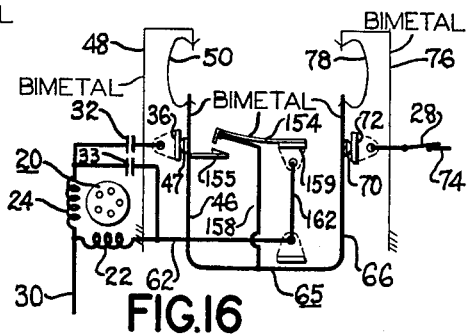
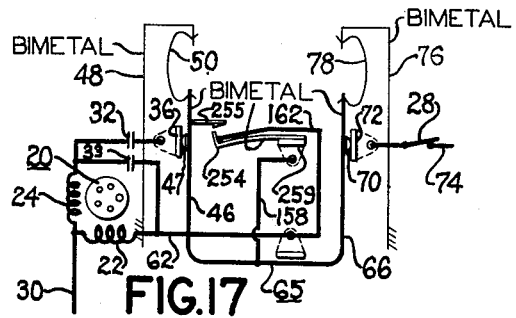
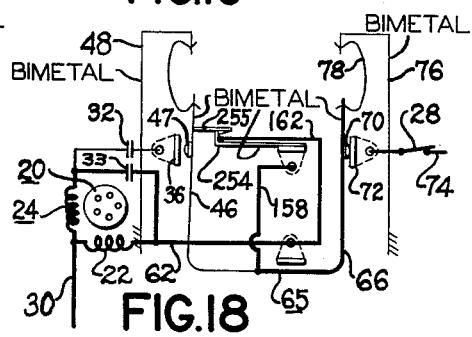
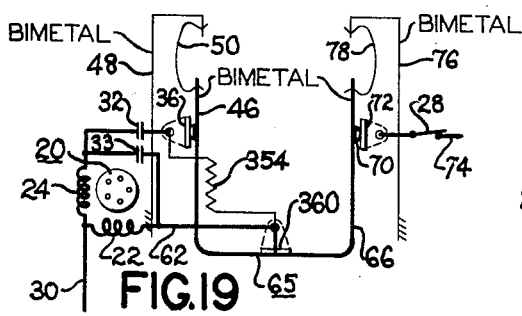
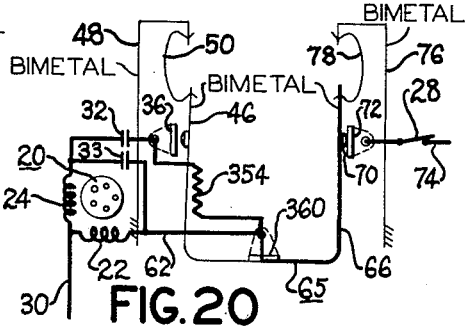
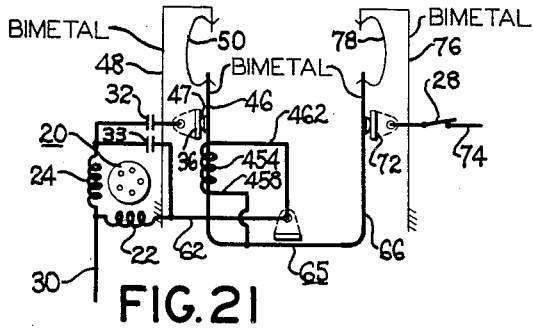
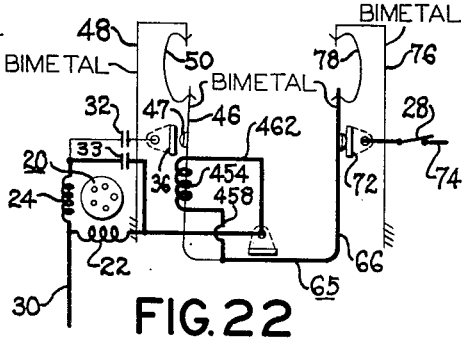
INVENTOR.
Harry F Clark
BY
Spencer Hardman & Fehr
Attorneys

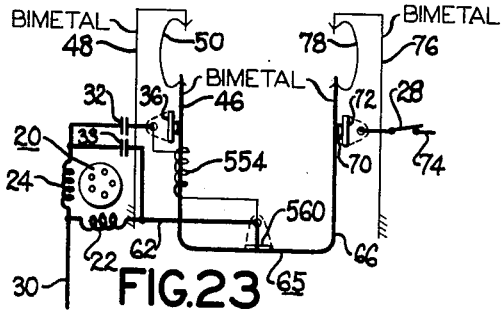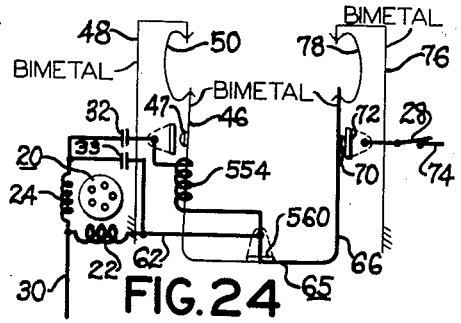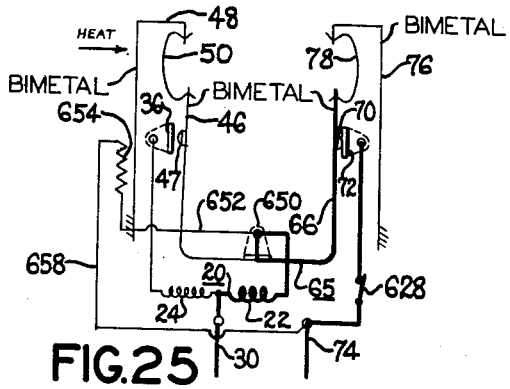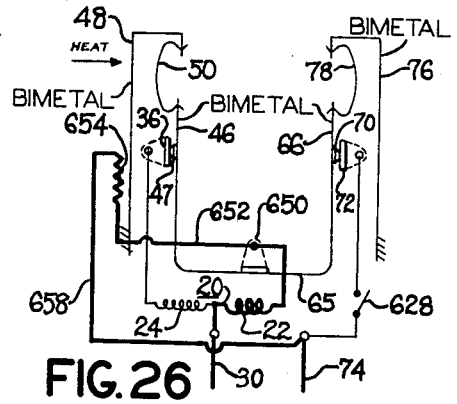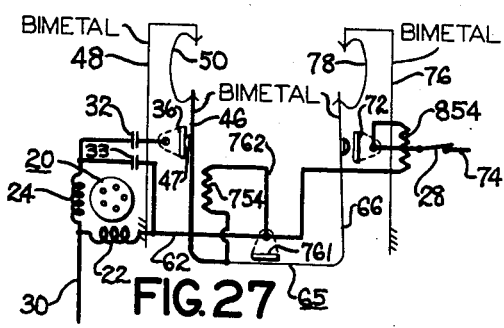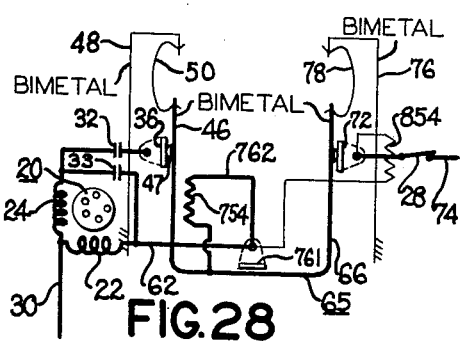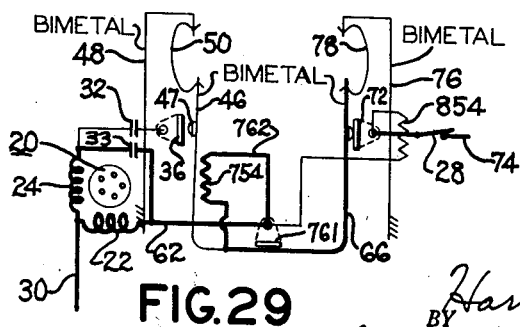

Patented Apr. 15, 1952

2,593,268

UNITED STATES PATENT OFFICE 2,593,268

SINGLE-PHASE MOTOR CONTROL

Harry F. Clark, Oakwood, Ohio, assignor to General Motors Corporation, Dayton, Ohio, a corporation of Delaware Application July 20, 1948, Serial No. 39,718

14 Claims. (Cl. 318—221)

1

This application is a continuation-in-part of my copending application S. N. 657,792 filed March 28, 1946, now Patent No. 2,447,488.

This invention relates to electrical apparatus and more particularly to starting and overload controls for split phase motors.

The use of bimetal phase winding controls for single phase induction motors is in its infancy.

It is an object of my invention to provide improved forms of bimetal phase winding controls which will provide improved characteristics and which will extend their usefulness and application.

It is another object of my invention to provide improved forms of bimetal phase winding controls which will be less critical and easier to manufacture.

It is another object of my invention to provide improved forms of bimetal phase winding controls which will be less expensive and more simple.

It is another object of my invention to provide improved forms of bimetal phase winding controls which will provide for quiet starting of the motor.

It is another object of my invention to provide a practical bimetal starting control for controlling the energization of the phase winding in which the bimetal will not be overheated under any operating condition.

It is another object of my invention to provide a simple bimetal low voltage control.

Generally speaking these objects are attained by providing a temperature compensated bimetal starting control in which two cantilever bimetal strip portions are provided in a compact form through the use of a U-shaped bimetal strip anchored at an intermediate portion, and two separate cantilever bimetal strip portions having their free ends each connected by a compression toggle spring with one of the free ends of the U-shaped strip. In the first form, as well as a number of the other forms both end portions of the U-shaped strip are biased to the closed position. The phase winding portion is maintained in the open position through a heater connected in series with the main winding supported and moved by a bimetal support also connected in series with the main winding so as to move the heater away from or toward the starting bimetal portion to regulate the amount of heat applied to the starting bimetal portion to control its reclosing at the end of a running period. In the other forms other thermal means are disclosed

2 for controlling the resetting of the starting bimetal portion.

Further objects and advantages of the present invention will be apparent from the following description, reference being had to the accompanying drawings wherein a preferred form of the present invention is clearly shown.

In the drawings:

Fig. 4 is a sectional view taken substantially along the line 4—4 of Fig. 1;

Fig. 5 is a sectional view taken substantially along the line 5—5 of Fig. 1;

Fig. 6 is an exploded isometric view of the phase reset control member;

Fig. 7 is an isometric view of the assembled phase reset control member;

Fig. 8 is a plan view of the essential portions of the control, together with a wiring diagram showing the connection to an electric motor of the capacitor start type with the control being shown in the "off" position;

Fig. 9 is a view of the control and wiring diagram similar to Fig. 8, but with the capacitor omitted and the parts and wiring illustrating the conditions during the running period under an extra heavy load. In this and other wiring diagrams the wiring carrying current is illustrated in heavy lines and the wiring not carrying current is illustrated in light lines;

Fig. 10 is a view of the control and wiring diagram similar to Figs. 8 and 9 with the parts and wiring shown in the reclosed position after the termination of a running period under heavy load;

Fig. 13 is a view similar to Figs. 8 to 12 in which the control and wiring is shown in the position immediately after the starting contacts have reclosed after a stalling of the motor has occurred;

Fig. 14 is a view similar to Figs. 8 to 13 showing the control and wiring in the condition assumed after the reclosing of the starting contacts following a motor stall but just before the overload switch recloses;

Fig. 15 is a diagrammatic view of a control and a motor wiring diagram of a second form of the invention shown in the normal running position;

Fig. 16 is a similar diagram illustrating the second form in the starting position;

Fig. 17 is a diagrammatic view of a third form of control and motor wiring diagram shown in the starting position;

Fig. 18 is a similar view with the control and motor wiring diagram shown in the normal running position;

Fig. 19 is a diagrammatic view of a fourth form of the invention shown in the starting position;

Fig. 20 is a similar view of the fourth form shown in the running position;

Fig. 21 is a diagrammatic view of the fifth form of control and motor wiring diagram shown in the starting position;

Fig. 22 is a similar diagram of the fifth form in the running position;

Fig. 23 is a diagrammatic view of a control and motor wiring diagram illustrating the sixth form of the invention shown in the starting position;

Fig. 24 is a similar view illustrating the sixth form in the running position;

Fig. 25 is a diagrammatic view of a control and motor wiring diagram illustrating the seventh form of the invention in the running position;

Fig. 26 is a similar view of the seventh form shown in the starting position;

Fig. 27 is a diagrammatic view of the eighth form of control and motor wiring diagram shown in the first starting position;

Fig. 28 is a similar view illustrating the second starting position; and

Fig. 29 is a similar view illustrating the running position.

Figure 1:
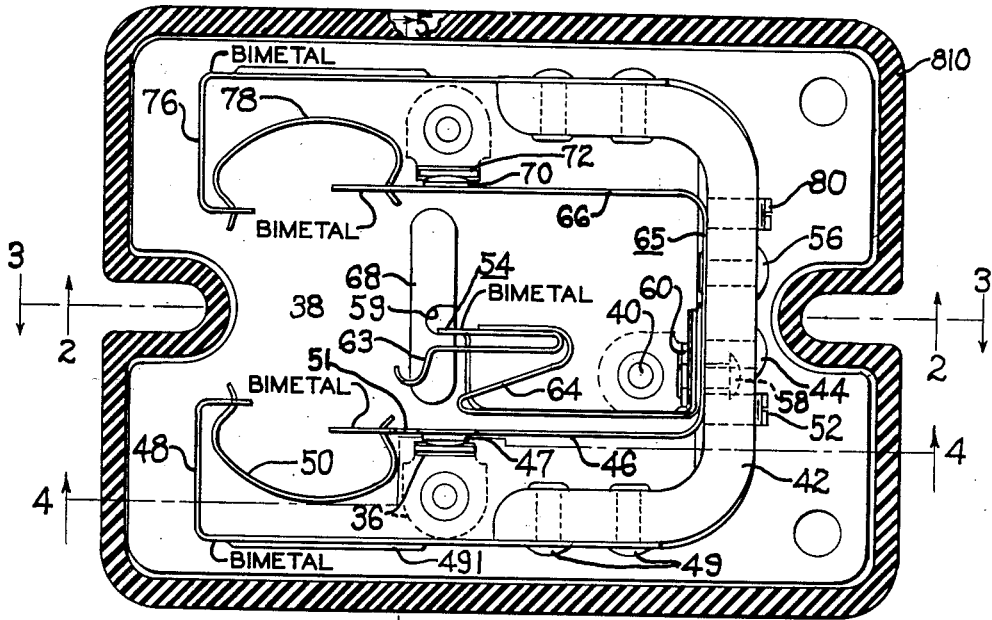
Fig. 1 is a top sectional view of a starting and overload control embodying the first form of my invention, taken substantially along the line 1—1 of Fig. 2.

Referring now to the drawings and more particularly to Fig. 8, there is shown an electric motor circuit including an electric motor 20 having a main or running winding 22 and a phase or starting winding 24. The common junction of the main and phase windings 22 and 24 is connected to the supply conductor 30. A capacitor 32 may be connected in series with the phase winding 24, if desired, as shown in Fig. 8, but my starting control will operate equally well without this capacitor and it may be omitted, as illustrated in Figs. 9 to 14, where an ample starting torque can be obtained without its use.

*Phase winding control*

The phase winding 24 and the capacitor 32 are connected by the conductor 34 to the L-shaped starting contact and terminal 36 (see Fig. 5), the horizontal portion of which is beneath the base 38 and is riveted thereto by the use of an eyelet rivet which is threaded. It carries a binding screw 40 for connection with the conductor 34. The vertical portion extends upwardly through a slot in the base 38 and forms the contact portion proper. The base 38 is made of a suitable molded electrical insulating material and carries an integral U-shaped rib 42 of the same material which supports the moving parts of the control. It is also provided with an X-shaped stiffening rib.

Fastened to this rib 42 by the rivets 44 and 56 is a U-shaped bimetal member 65 having one leg 46 forming the starting or phase cantilever bimetal strip portion having its high expansion side facing outwardly away from the center of the base. The high expansion side of the yoke portion of the U-shaped bimetal member 65 lies directly against the rib 42. The movable end portion of the cantilever strip portion 46 carries a movable starting contact 47 shown in engagement with the L-shaped stationary starting contact 36. When the contacts 36 and 47 are closed, the strip 46 is thereby connected in series with the phase winding 24 and carries and is self-heated by the starting or phase winding current. The outer face of the rib 42 carries a hook-shaped temperature compensating bimetal strip 48 also having its high expansion side facing outwardly from the center of the base 38 and having its low expansion side lying against the outside of the rib 42. It is fastened to the rib 42 by two rivets 49. This compensating strip 48 has the same effective length as the cantilever strip portion 46, but preferably it is much wider as will be evident from a vertical section, shown in Figs. 3 to 5 inclusive.

The adjacent movable ends of the compensating strip 48 and the starting bimetal strip portion 46 are connected by a thin C-shaped toggle leaf spring 50. The end of the compensating bimetal strip 48 is notched while the adjacent end of the starting bimetal strip portion 46 is provided with a small rectangular aperture 51 for receiving and holding the adjacent notched end portions of the spring 50. This forms the equivalent of a double toggle snap-acting arrangement since both the bimetal strip portions 46 and 48 are flexible. A set screw 52 threads through the rib 42 and engages the base portion of the starting bimetal strip portion 46 to adjust its position. In this form, the geometrical arrangement and the adjustment of the set screw 52 is such that when the starting bimetal strip portion 46 and its contact 47 are in either the open or the closed position the toggle spring 50 is at such an angle that when the strip 46 is cool it will move to or remain in the closed position.

The effect of ambient temperature upon the starting bimetal strip portion 46 is compensated for by the effect of ambient temperature upon the temperature compensating bimetal strip 48, since both strip portions have their high expansion sides facing outwardly and therefore deflect in the same direction upon ambient temperature changes. Thus as the ambient temperature rises, the starting bimetal strip portion 46 will have an increasing tendency to move away from the stationary contact 36 tending to reduce the contact pressure between the contacts 36 and 47. But as the ambient temperature rises, the compensating bimetal strip 48 will deflect in the same general direction toward the stationary contact 36 to increase the angle of the toggle spring 50 to add to the original contact pressure an amount sufficient to substantially compensate for the tendency of the starting bimetal strip portion 46 to reduce the contact pressure upon a rise in ambient temperature.

Where the load connected to the motor increases with the increase in ambient temperature, the compensating bimetal strip 48 may be selected to slightly over-compensate for the effect of ambient temperature to increase the starting time as the ambient temperature increases. If the load should decrease with the ambient temperature, then the compensating bimetal strip 48 may be selected to slightly under-compensate for the effect of ambient temperature. To regulate the deflection of the compensating bimetal strip 48 it is provided with a central embossed rib 491 which stiffens and reduces the deflection of the mid-portion of the compensating strip to the amount desired to regulate its compensating effect. The length of this embossed rib 491 may be lengthened or shortened to secure the amount of stiffness and deflection desired.

*The reclosing control*

Since the starting bimetal strip portion 46 is biased to the closed or starting position and moved to the open or running position by being self-heated by the phase winding current and since the phase winding current ceases upon the separation of the contacts 36, 47, some means is necessary to hold the strip portion 46 in the open or running position throughout the remainder of the running period of the motor to prevent the reclosing of these contacts 36, 47. According to my invention, in this first form there is provided a reclosing bimetal member 54, most clearly shown in Fig. 6. The base of this reclosing bimetal member 54 is fastened to an L-shaped main winding terminal member 60. The base of the reclosing bimetal 54 is held in place between the vertical portion of the terminal member 60 and the rib 42 by a rivet 58 which extends through the rib 42. The horizontal portion of this terminal member 60 is beneath the base and is riveted thereto by the use of an eyelet rivet. A binding screw 40 threads into this eyelet rivet and connects the conductor 62 to the terminal 60.

Figure 3:
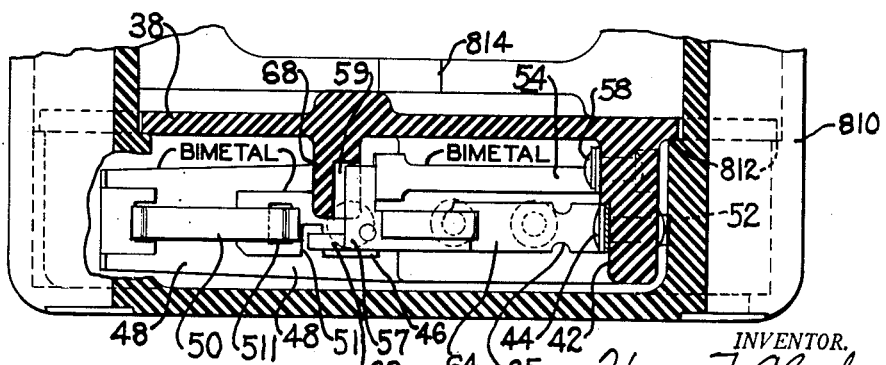
Fig. 3 is a sectional view taken along the line 3—3 of Fig. 1.

The reclosing bimetal member 54 has its high expansion side facing the starting strip portion 46 so that upon heating it will bend away. This reclosing bimetal member 54 has a portion extending substantially parallel, but offset from the starting bimetal strip portion 46 as shown in Figs. 3 and 4. It also has at the movable end portion opposite the base a lateral projecting portion 57 which extends into a notch 59 provided in an island 68. The engagement of this projection 57 with the notch 59 limits its movement toward the starting bimetal strip portion 46. Extending from the projecting portion 57 of the reclosing bimetal member 54 is an integral double back arm 63 having a curled or hook-end portion.

It should be noted that the projecting portion 57 is wide and the arm 63 is offset so that it is in alignment with the path of movement of the starting bimetal strip portion 46. At the connection of this arm with the projecting portion 57 there is welded one end of an electric heater 64. As is clearly shown in Figs. 6 to 8, the heater 64 extends down the rear face of the anchorage of the arm 63 and thence around the bottom thereof, and then, after being curled around the folded portion of the arm 63 extends upwardly at an angle and is then turned sharply downwardly and from this point extends adjacent to and generally parallel to the starting bimetal strip portion 46. It is provided with a base portion bent at right angles and fastened beneath the rivet 44 which holds the U-shaped bimetal 65 tightly against the rib 42. The lower portion of the heater 64 is notched as designated by the reference character 65 to regulate the current flow therethrough as well as the temperature attained in other parts of the heater. This also increases the flexibility at the base of the heater 64. With the base of the reclosing bimetal member 54 being connected to the terminal 60 which in turn is connected by the screw 40 to the main winding 22 and with the base of the heater 64 being fastened by the rivet 44 to the adjacent portion of the U-shaped bimetal member 65 and the rib 42, all of the main winding current will traverse the reclosing bimetal 54 and the reclosing heater 64.

This main winding current, together with the current flowing from the phase winding 24 through the starting contacts 36, 47 and the starting bimetal strip portion 46, will flow through the second leg 66 which forms the overload bimetal strip portion of the U-shaped bimetal member 65. The overload bimetal strip portion 66 carries a movable contact 70 which makes contact with the L-shaped stationary contact and terminal member 72 connecting through a main switch 28 with the other supply conductor 74. An overload compensating bimetal strip 76 having its high expansion side turned outwardly relative to the center of the base 38 like the overload bimetal strip portion 66, is fastened by rivets to the adjacent outer face of the rib 42. It is similar to the compensating strip 48. Its end portion is notched and the movable end portion of the overload bimetal strip portion is provided with a rectangular aperture to receive the offset notched ends of the C-shaped toggle leaf spring 78 which may be identical to the toggle spring 50. The overload bimetal strip portion 66 is self-heated by the current flowing through the overload contacts 70, 72 to the supply conductor 74.

Figure 2:
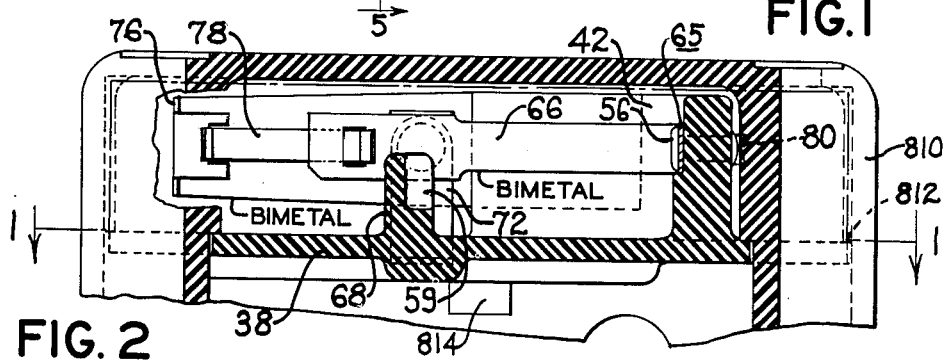
Fig. 2 is a sectional view taken along the line 2—2 of Fig. 1.

When the strip portion 66 is self-heated sufficiently it will trip to the open position. The tripping point of the overload strip portion 66 is adjusted by bending the vertical portion of the terminal 72 toward or away from the strip portion 66 in order to reduce or increase the current value at which the overload portion 66 trips to the open position. The reclosing of the overload portion 66 is adjusted by the set screw 80 which bears against the base of the overload bimetal strip portion 66 to adjust its position. The overload bimetal strip portion 66 is considerably wider than the starting bimetal strip 46, since it must be capable of carrying both the starting and main winding currents under maximum starting and running loads. As is evident from Fig. 2 the overload compensating bimetal 76 is considerably wider than the overload bimetal strip portion 66. The overload compensating bimetal 76 is provided with a stiffening rib which restricts the flexibility and increases the stiffness of its mid-portion to control its deflection. Preferably this overload compensating strip portion is slightly under-compensated for change in ambient temperature to further compensate for the reduced rate of heat dissipation of electric motors at higher ambient temperatures.

*Operation of the first form*

When the main switch 28 is closed (see Figs. 8 and 10), current will flow from the supply conductor 30 through the phase winding 24, the capacitor 32, the conductor 34, the contacts 36, 47 through the starting bimetal strip portion 46 to the rivet 44. Current will also flow from the supply conductor 30 through the main winding 22, the conductor 62, the terminal 60 through the reclosing bimetal member 54 to its connection with the heater 64 and through the heater 64 to the rivet 44. From the rivet 44 both the starting and main winding current will flow through the overload bimetal strip portion 66 to the contacts 70, 72 and through the main switch 28 to the supply conductor 74. At this time the phase winding current is greater than the main winding current and will heat the starting bimetal strip portion 46 within a short time sufficiently to move to the open or running position against the island 68 which serves as a stop to limit its opening movement. At the same time the heater 64 is being heated by the main winding current and when the starting bimetal strip portion 46 moves to its open position against the island 68, as shown, for example in Fig. 9, it will be very close to the upper portion of the heater 64 which is narrowed so as to provide an additional amount of heat at the point where it is closest to the starting bimetal strip portion 46, to keep the starting bimetal strip portion 46 heated sufficiently to prevent its re-cooling as long as the main winding current flows. Under light loads the re-closing bimetal member 54 and heater 64 more nearly approach the position illustrated in Fig. 8 and the upper end of the heater 64 is very close to the starting bimetal strip 46 when it is in the open position.

The bimetal 54 is made sufficiently wide that it will not move away from the near side of notch 59 under any normal running current. Likewise under any normal running current the heater 64 will not overheat the starting bimetal strip portion 46. When the circuit is deenergized in the normal manner by the opening of the main switch 28, the starting bimetal strip portion 46 will quickly cool below the temperature required to maintain it in the open (running) position and return to closed (starting) position so as to be in closed position for the next starting cycle, as illustrated in Fig. 10.

Figure 11:
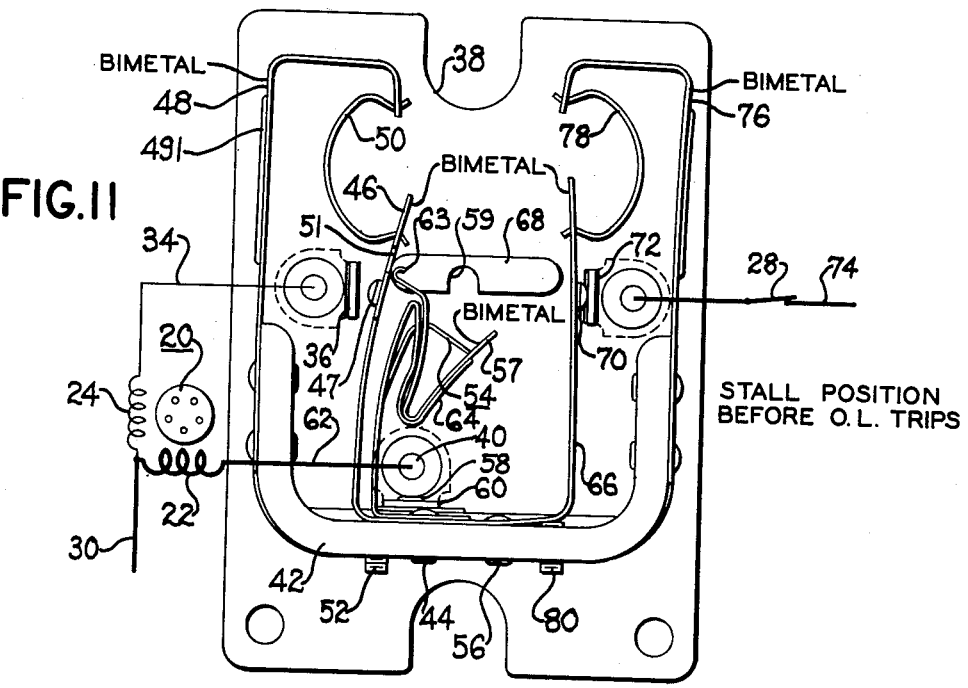
Fig. 11 is a diagram similar to Figs. 8 to 10 with the parts and wiring shown under motor stalling conditions just before the overload switch trips to the open position.

However, if the heater 64 were to remain in the position shown in Fig. 8 during a stall, the starting bimetal strip portion 46 would be overheated and lose its temper and its calibration. Also too much heat would be stored in the starting bimetal strip portion 66 so that it would not reclose before the overload bimetal strip portion 66 would reclose Therefore I have made the reclosing bimetal member 54 sufficiently narrow that under a stall or other excessive current condition it will bend away from the strip portion 56 as shown in Fig. 11. This will prevent the starting bimetal strip portion 46 from being overheated between the time the overload starts until the overload bimetal strip portion 66 trips to the open circuit position to stop all current flow through the bimetals and heaters.

Figure 12:
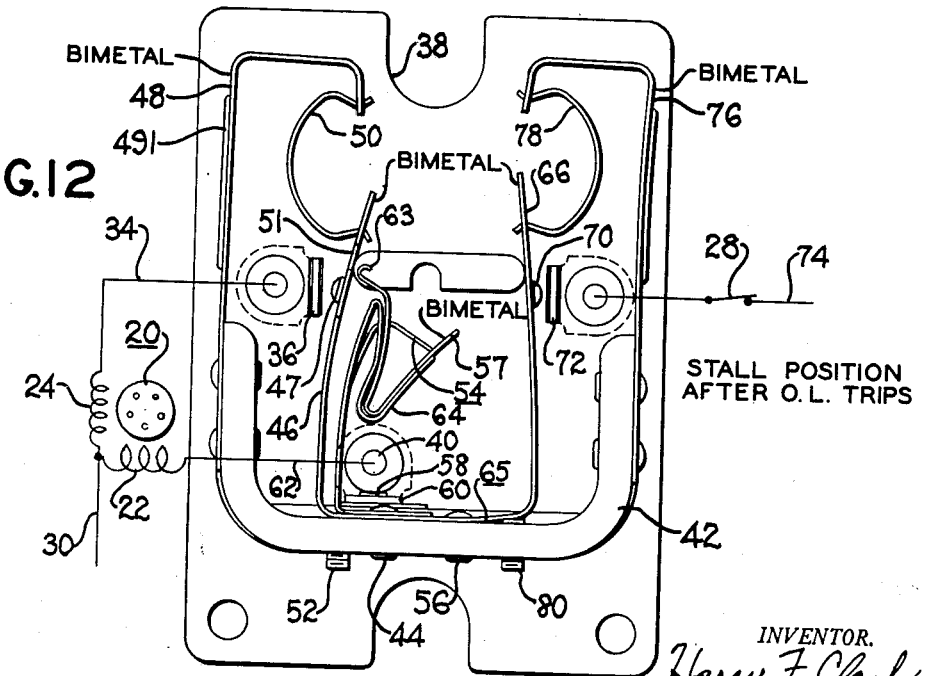
Fig. 12 is a view similar to Figs. 8 to 11 with the control and the wiring shown under motor stalling conditions immediately after the overload switch has tripped to the open position.

It will be seen that as the reclosing bimetal member 54 carries the heater 64 away from the starting bimetal strip 46 the double back arm 63 opens widely. It will be seen that under the normal maximum running current the arm 63 has opened up somewhat in Fig. 9 and has entered a clearance notch 51 provided in the starting bimetal strip portion 46 to prevent it from shoving the starting strip 46 to the closed circuit position. However, when the reclosing bimetal member 54 becomes heated to a greater extent under a stall or other excessive overload the extreme end of the arm 63 is moved downwardly so that it no longer registers with the notch 51 but is in a position to positively engage the strip portion 46. The extreme position of the reclosing heater 64 as well as the arm 63 is illustrated in Fig. 12 when the overload contacts trip due to the heat generated by the overload.

After this, the entire apparatus begins to cool slowly. However, to insure the reclosing of the starting bimetal 46 before the closing of the overload bimetal strip portion 66, the cooling of the reclosing bimetal 54 first brings the arm 63 into engagement with the starting strip portion 66 and after sufficient additional cooling, moves the starting bimetal strip portion 46 to closed position, as shown in Fig. 13, before the overload contacts reclose. Additional cooling takes place as illustrated in Fig. 14 before the overload contacts reclose. This is necessary for the reason that the arm 63 must be retracted at least to the position shown in Fig. 9 so that free movement of the starting bimetal strip portion 46 is possible before the overload contacts reset. Thus after a stall or excessive overload the control will reset in such a manner as to be able to restart the motor in the normal manner.

*The second form*

In the second form illustrated in Figs. 15 and 16, the starting, overload and compensating bimetals, together with the toggle springs are the same as that disclosed in the first form. The adjustment of the starting bimetal strip portion 46 by means of its set screw 52 is so made that the starting bimetal strip portion 46 is always urged to the closed position by the spring of its connection with the base and by the angularity of the toggle spring 50 in the toggle arrangement when cool. The motor is of the split phase type but is shown as having a running capacitor 33 connected across the terminals of the main winding 22 and the phase or starting winding 24. A starting capacitor 32 is also included. However, the running capacitor 33 or both capacitors may be omitted if desired.

The reset control, however, is different. It includes a latch member 155 connected to the starting bimetal strip portion 46. It also includes a bimetal member 154 having a hook-shaped end for hooking the latch member 155 when the starting bimetal strip portion 46 is in the open circuit position. The opposite end of the bimetal 154 from the movable hooked end portion is anchored to a terminal member 159. This terminal member 159 is connected by a conductor 162 to the conductor 62 which connects to the main winding 22. The free end of the bimetal 154 is connected by a conductor 158 to the U-shaped bimetal member 65.

In Fig. 15 the bimetal 154 is in the position it assumes at the beginning of the starting period when it is cool. The closing of the main switch 28, causes heavy current to flow through it thereby quickly causing it to bow upwardly to the position shown in Fig. 16, thereby releasing the starting bimetal strip portion 46 to allow it to quickly move to the closed position illustrated in Fig. 16. Current then flows through both windings as illustrated in Fig. 16 until the starting bimetal strip portion 46 moves to the open circuit position. During this time the current flowing through the main winding and the bimetal 154 has reduced to such a relatively small amount that the bimetal 154 returns to the position shown in Fig. 15 and engages the latch 155 before the starting bimetal strip portion 46 has an opportunity to cool and return to the closed position. The parts and circuits remain in the condition shown in Fig. 15 throughout the remainder of the running period and throughout the succeeding idle period when the main switch 28 is open. Resetting of the starting bimetal strip portion 46 is accomplished when the main switch 28 is reclosed following an idle period.

*The third form*

In the third form, illustrated in Figs. 17 and 18, the motor, the U-shaped starting and overload bimetal 65, the toggle springs and the compensating strips are the same as that explained in connection with Figs. 15 and 16. The reset control also includes a latch member 255 connected to the starting bimetal strip portion 46. There is also provided a bimetal member 254 anchored to a terminal 259 and having a movable hook-shaped end adapted to make a latching connection with the latch member 255 when the starting bimetal strip portion 46 is moved to the open circuit position. In this form, however, the bimetal 254 assumes an unlatched position when cool, as shown in Fig. 17.

Thus during any idle period, when no current flows through the motor circuit and the control, the bimetal 254 is bowed downwardly as in Fig. 17 to its unlatched position thereby allowing the starting bimetal strip portion 46 to move to the closed position under its normal bias. When the circuits are energized by the closing of the main switch 28, the starting bimetal strip portion, by the time the motor 20 attains a balancing speed, that is the proper switching speed, will become sufficiently heated to move to the open circuit position illustrated in Fig. 18. During this time the bimetal 254 will also be heated since it is connected in series with the main winding through the conductors 62 and 162 as well as the conductor 158 in a manner similar to Figs. 15 and 16. Before the bimetal 46 has cooled sufficiently to return to the closed position, the bimetal 254 will be heated sufficiently to move to the latching position illustrated in Fig. 18 to engage the latch member 255 and prevent the return of the starting bimetal strip portion 46 to the closed position as long as current flows through the main winding 22.

The fourth form

In the fourth form illustrated in Figs. 19 and 20, the motor as well as the U-shaped starting and overload bimetal member 65, the toggle springs and the compensating bimetals are the same as illustrated in Figs. 15 to 18. A different reset control means is employed. In this reset control means there is provided a shunt heater 354 having one terminal connected to the L-shaped starting contacts and terminal 36 and the other terminal connected to a terminal 360 which connects directly to the yoke portion of the U-shaped starting overload bimetal 65. This shunt heater 354 has a high resistance and during the starting period is deenergized since it is shunted out by reclosing of the starting contacts 36, 47 and the starting bimetal strip portion 46. However, the starting bimetal strip portion 46 during this period is self-heated by the phase winding current and when the motor 20 reaches the proper switching speed it will move to the open position.

The heating of the shunt heater 354 is at a substantially constant rate after it reaches its maximum temperature due to the fact that it is connected in a shunt circuit instead of a series circuit. It has a sufficiently high heating value to supply sufficient heat to the starting bimetal strip portion 46 throughout the running period to hold the starting bimetal strip portion 46 in the open position, as shown in Fig. 20. When the motor and control are completely deenergized by the opening of the main switch 28 or by opening of the overload contacts, the heater 354 will be deenergized and the starting bimetal strip portion 46 will cool and return to the closed position under its normal bias so that it is ready for the next starting effort.

The fifth form

In the fifth form illustrated in Figs. 21 and 22, the motor as well as the U-shaped starting and overload bimetal member, the toggle springs and the compensating bimetals are the same as described in connection with Figs. 15 to 20. The starting bimetal strip portion 46 is normally biased to the closed or starting position. The reclosing control differs from the other controls in that it includes an induction heating coil 454 which is located in induction heating relationship to the starting bimetal strip portion, as shown in Figs. 21 and 22. This coil 454 may be mounted on the strip portion 46 between the starting contacts and the set screw 52 so as to move with the strip portion 46 or the induction heating coil 454 may be stationary and have coils surrounding the strip portion 46 sufficient in size to permit the movement of the strip portion 46 within it. Preferably the heater 454 is coiled around the strip portion 46, but if desired some other induction heating arrangement might be used. The induction heater 454 in Figs. 21 and 22 is shown connected by the conductors 62 and 462 in series with the main winding 22. It is connected by the conductor 458 with the yoke portion of the U-shaped overload and starting bimetal strip member 65.

When the motor and the control are energized by the closing of the main switch 28, the starting bimetal strip portion 46 will be self-heated by the phase winding current as before. The main winding current is relatively small at this time so that the induction heater 454 will contribute very little heat to the bimetal strip portion 46. However, when the proper switching speed is reached the starting bimetal strip portion 46 will be heated sufficiently to open. It will be kept in the open position by the heating effect of the induction heater 454 which is provided with sufficient capacity to heat the starting bimetal strip 46 to a sufficient extent upon the normal main winding current to prevent return to the closed circuit position. The running position is illustrated in Fig. 22.

The sixth form

In the sixth form illustrated in Figs. 23 and 24, the motor, the U-shaped starting and overload bimetal 65, the toggle springs and the compensating bimetals are the same as described and illustrated in connection with forms 2 to 5. For a reclosing control it includes an induction heater 554 located in induction heating relationship with the starting bimetal strip portion 46 between the starting contacts and the set screw 52 at the base. As mentioned in connection with form five, this induction heater 554 may be either mounted to move with the starting bimetal 46 or it may be stationary. In either case the heater is preferably wrapped around the starting bimetal 46 in such a manner as to produce maximum induction heating. Where the induction heating coil 554 is stationary, the coils are preferably sufficient in size to permit free movement of the starting bimetal strip 46. This induction heater 554 is connected in shunt with the starting contacts 36, 47 and the starting bimetal strip portion 46 in a manner similar to form four. It has one terminal connected to the starting contact and overload terminal 36 and its other terminal connected to a terminal 560 which is electrically connected to the base portion of the U-shaped bimetal starting overload control member 65 and which is connected by the conductor 62 to the main winding 22 of the motor 20.

When cool, the starting bimetal strip portion 46 is biased to the closed position which it assumes during every idle period whether occasioned by the opening of the main switch 28 or the overload contacts 70, 72. It is of course deenergized during the starting period by being shunted out by the starting contacts 36, 47 and the starting bimetal strip portion 46. When the starting contacts 36, 47 and the starting bimetal strip portion 46 are moved to the open circuit position when the motor 20 attains the proper switching speed, the induction heater 554 will be energized and will heat the starting bimetal 46 sufficiently to hold it in the open circuit position as shown in Fig. 24.

The seventh form

In the seventh form the motor as well as the U-shaped starting and overload bimetal member 65, the toggle springs and the compensating bimetals are like that described and illustrated in connection with the first form. It differs from the first form in that the set screw 52 is adjusted so that the starting bimetal strip portion 46 will remain in either the open or closed position but heating or cooling, or some other means will be required to move it from one position to another. To move the starting bimetal strip portion 46 to the closed position there is provided a heater 654 located in heat exchange relationship not with the starting bimetal 46 but in heat exchange relationship with the compensating bimetal 48. One terminal of this heater 64 is connected by the conductor 652 to a terminal 650 which connects to the yoke portion of the U-shaped starting and overload bimetal member 65. The other terminal of the heater 654 is connected by the conductor 658 to the supply conductor 74 so that it shunts the overload bimetal strip portion 66, the overload contacts 70, 72, and the main switch 628.

If either the overload or the main switch 628 is opened, the heater 654 will be energized sufficiently to heat the compensating bimetal 48 so as to cause it to bow toward the starting bimetal 46 to move through the toggle spring 50, the starting bimetal strip portion 46 to the closed position as illustrated in Fig. 26. The heater 654 must have a high resistance since it is a shunt heater, to reduce the current flow to a small amount. When both the main switch 628 and the overload contacts 70, 72 are closed the heater 654 is deenergized and current will flow through the phase winding 24 and the starting contacts 36, 47 and through the starting bimetal strip portion 46 to heat the starting bimetal strip portion 46 and cause it to move to the open circuit position illustrated in Fig. 25. It will remain in this position during the succeeding running and idle periods until the following starting period of the motor 20 by reason of its bias causing it to remain in either the open or closed positions.

The eighth form

In the eighth form illustrated in Figs. 27 to 29 inclusive, the motor is similar to that shown in the forms 2 to 6 while the U-shaped starting and bimetal overload 65, as well as the toggle springs and the compensating bimetals are like that described and illustrated in connection for form seven. The set screw 52 is adjusted to cause starting strip portion 46 to move to and remain in closed position when cool. A series heater 754 preferably similar to the bimetal 54 and the heater 64 used in connection with form one is used as a reclosing control for the starting bimetal 46. Its one terminal is connected by the conductors 762 and 62 to the main winding 22 of the motor 20, while its other terminal is connected to the yoke portion of the U-shaped starting and overload bimetal member 65.

Instead of providing a heater applied to the compensating bimetal 48 for the starting bimetal system, form eight includes a heater 854 having one terminal connected to the L-shaped stationary overload contact 72. The heater 854 has a second terminal connected to the terminal 761 to which the conductors 762 and 62 are connected. The heater 854 is placed in heat exchange relationship with the overload compensating bimetal 76. The overload contacts 70, 72 and the overload bimetal strip portion 66 are adjusted by the adjustment of the set screw 80 so that they are normally in the open position.

When the main switch 28 is closed current flows from the supply conductor 30 through the main winding to the terminal 761, thence through the heater 854 to the overload stationary contact and terminal 72 and through the main supply switch to the supply conductor 74. When the supply voltage is sufficiently high for normal operation this heats the overload bimetal 76 sufficiently to cause it to bow toward the overload bimetal member 65 and by the geometry of the toggle spring 78 cause the overload bimetal strip portion 66 to move the overload contact 70 to the closed circuit position. This permits starting and running current to flow through the motor 20. If the supply voltage is too low, the current flow will not be sufficient for the heater 854 to cause the closing of the overload contacts.

The starting current flows from the supply conductor 30 through the phase winding 24 and the capacitor 32 to the starting contact and terminal 36, thence through the starting leg 45 of the U-shaped bimetal 65. Current also flows from the supply conductor 30 through the main winding 22 and the conductor 62 to the terminal 761 and the conductor 762 to the heater 754 which likewise connects to the U-shaped bimetal member 65. Both currents then pass through the overload leg 66 and through the overload contacts 70, 72 and the main switch 28 to the other supply conductor 74. This causes the motor to start and at the proper speed the bimetal 46 will become self-heated sufficiently to move to the open or running position. The current flowing through the starting bimetal portion 46 more quickly affects its temperature than the heater 754 because of self-heating and almost exclusively controls the opening of the starting contacts. The heating effect of the heater 754 exerts its influence soon enough to hold the starting bimetal portion 46 in the open or running position to which it moves at the end of the starting period as described in connection with form one. Throughout the remainder of the running period the heater 754 supplies sufficient heat to the starting bimetal portion 46 due to the main winding current flowing through it to keep this starting bimetal portion 46 in the open position, as shown in Fig. 29. Thus in this form, by using an electrical arrangement which is similar to form seven, I have provided extremely simple low voltage control by simply adding a shunt heater to the overload compensating bimetal 76.

In all the forms the base and the mechanism thereon is preferably enclosed in a case 810, such as is shown in Figs. 1 to 5 of the first form. This case 810 is provided with an interior ledge 812 against which the base 38 rests. The case 810 is also provided with projections 814 in the shape of a ramp so that when the base 38 is pushed into place the ramp shape of the projections 814 will push outwardly the side walls of the case 810 and snap in place between the upper end of the projections 814 and the ledge 812. This provides a secure enclosure protecting the mechanism. Beneath the base 38 it provides a housing for the wiring which is attached to the terminals 36, 60 and 72 which extend to the underneath side of the base 38. The base 38 can be removed from the case 810 by spreading the side walls of the case 810 so that the base 38 is free from the projections 814.

While the form of embodiment of the invention as herein disclosed, constitutes a preferred form it is to be understood that other forms might be adopted, as may come within the scope of the claims which follow.

What is claimed is as follows:

1. A control for an electric motor having main and phase windings including a first cantilever supported single bimetal strip means and a second cantilever supported single bimetal strip means each having a movable end portion, a toggle spring means extending between and connecting the movable end portions of said strip means, a switch means connected to and operated by said first strip means, said switch means and said first strip means being connected in series electrical circuit relationship with said phase winding to change the phase winding from the starting circuit arrangement to the running circuit arrangement, and an additional heating means connected to the motor circuit and extending along and mounted closely adjacent one of said strip means for heating said one strip means to regulate the change of the phase winding from the running circuit condition to the starting circuit condition.

2. A control for an electric motor having main and phase windings including a bimetal strip means and a switch means controlled by the movement of the strip means from the starting position to the running position, said switch means and said strip means being connected in series with the phase winding to control its energization, a heating means located closely adjacent said strip means and connected in series with said main winding for keeping the switch means and the strip means in the running position during the running period, and a temperature responsive support means for said heating means for moving said heating means toward and away from said strip means in accordance with temperature changes.

3. A control for an electric motor having main and phase windings including a first bimetal strip means and a switch means controlled by the movement of the strip means from the starting position to the running position, said switch and said strip means being connected in series with the phase winding to control its energization, a heating means located adjacent said strip means and connected in series with said main winding for keeping the switch means and the strip means in the running position during the running period, and an electrothermal support means for said heating means connected in series with said main winding for moving said heating means toward and away from said strip means.

4. A control for an electric motor having main and phase windings including a bimetal strip means and a switch means controlled by the movement of the bimetal strip means connected in series with the phase winding so as to be heated sufficiently to move from the starting to the running position, an electrical heating means having a portion extending along and closely adjacent to a portion of said strip means, a second bimetal strip means for normally supporting said heating means adjacent the first mentioned strip means and for carrying said heating means away from the first mentioned bimetal strip means upon the occurrence of a predetermined change in temperature, said heating means being connected in series with said main winding for heating the first mentioned strip means sufficiently to remain in the running position.

5. A control for an electric motor having main and phase windings including a first bimetal strip means and a switch means controlled by the movement of the strip means from the starting position to the running position, said switch means and said strip means being connected in series with the phase winding to control its energization, a heating means located closely adjacent said strip means and connected in series with said main winding for keeping the switch means and the strip means in the running position during the running period, a movable bimetal support means for said heating means connected in series with said main winding, said support means having a portion with its high expansion side facing said strip means to cause it to bow away from the strip means and carry the heating means away from the strip means upon an increase in its temperature.

6. A control for an electric motor having main and phase windings including a first bimetal strip means and a switch means controlled by the movement of the strip means from the starting position to the running position, said switch means and said strip means being connected in series with the phase winding to control its energization, a heating means located adjacent said strip means and connected in series with said main winding for keeping the switch means and the strip means in the running position during the running period, a movable bimetal support means for said heating means connected in series with said main winding, said support means having an arm extending therefrom and movable to a position in engagement with the strip means upon predetermined temperature changes thereof.

7. A control for an electric motor having main and phase windings including a first bimetal strip means and a switch means controlled by the movement of the strip means from the starting position to the running position for controlling the energization of the phase winding, snap-acting means for controlling the movement of the strip means between the starting and running positions, a second bimetal strip means having a movable end portion provided with a double backed arm extending adjacent said first strip means, an electrical heater having one end fastened to said movable end portion and extending therefrom adjacent said arm and thence adjacent said first strip means, means for heating said first heating means coincidentally with the energization of the phase winding, and means for connecting said second strip means and said heater in series circuit relation with the main winding.

8. A control for an electric motor having main and phase windings including a bimetal strip means and a switch means controlled by the movement of the strip means from the starting position to the running position, said switch means and said strip means being connected in series with the phase winding to control its energization, a heating means extending along and located closely adjacent said strip means and connected in series with said main winding for keeping the switch means and the strip means in the running position during the running period, and a temperature responsive means connected to said heating means for regulating the heat supplied by said heating means to said strip means.

9. A control for an electric motor having main and phase windings including a first bimetal strip means and a second bimetal strip means each having a movable end portion, a toggle spring means extending between and connecting the movable end portions of said strip means, a switch means connected to and operated by said first strip means, said switch means and said first strip means being connected in series electrical circuit relationship with said phase winding to change the phase winding from the starting circuit arrangement to the running circuit arrangement, and an additional heating means connected to the motor circuit extending along and mounted closely adjacent one of said strip means for heating said one strip means to regulate the change of the phase winding from the running circuit condition to the starting circuit condition, and temperature responsive means connected to said additional heating means for regulating the heat supplied by said additional heating means to said adjacent strip means.

10. A control for an electric motor having main and phase windings including a first cantilever supported single bimetal strip means and a second cantilever supported single bimetal strip means each having a movable end portion, a toggle spring means extending between and connecting the movable end portions of said strip means, a switch means connected to and operated by said first strip means, said switch means and said first strip means being connected in series electrical circuit relationship with said phase winding to change the phase winding from the starting circuit arrangement to the running circuit arrangement, and an additional shunt heating means connected to the motor circuit in shunt circuit arrangement with said switch means and extending along and mounted closely adjacent one of said strip means for heating said one strip means to regulate the change of the phase winding from the running circuit condition to the starting circuit condition.

11. A control for an electric motor having main and phase windings including a first cantilever supported single bimetal strip means and a second cantilever supported single bimetal strip means each having a movable end portion, a toggle spring means extending between and connecting the movable end portions of said strip means, a switch means connected to and operated by said first strip means, said switch means and said strip means being connected in series electrical circuit relationship with the phase winding to change the phase winding from the starting circuit arrangement to the running circuit arrangement, an additional heating means located closely adjacent said strip means and connected to the motor circuit and extending along and mounted closely adjacent one of said strip means for heating said one strip means to regulate the change of the phase winding from the running circuit condition to the starting circuit condition, and means for heating the second strip means to operate the toggle means and the first strip means from the running circuit arrangement to the starting circuit arrangement.

12. A control for an electric motor having main and phase windings including a first cantilever supported single bimetal strip means and a second cantilever supported single bimetal strip means each having a movable end portion, a toggle spring means extending between and connecting the movable end portions of said strip means, a switch means connected to and operated by said first strip means, said switch means and said first strip means being connected in series electrical circuit relationship with said phase winding to change the phase winding from the starting circuit arrangement to the running circuit arrangement, and an additional heating means connected to the motor circuit and extending along and mounted closely adjacent one of said strip means for heating said one strip means to regulate the change of the phase winding from the running circuit condition to the starting circuit condition, said additional heating means being in the form of an induction heating means located in induction heating relationship to said one strip means.

13. A control including a single bimetal strip means, a control means connected and operated by the movement of a portion of said single strip means, means including a first heating circuit under the control of said control means for heating said single strip means, an electrical means to be controlled connected to said first heating circuit, a second heating circuit portion including a second heating means extending closely along side a major portion of said single strip means having as its primary function the heating of said single strip means, said second electric circuit portion being connected in parallel circuit relationship with the first heating circuit for supplying energy to the second heating means and for heating said single strip means, and a temperature responsive support means for said second heating means for moving the second heating means toward and away from the single strip means in accordance with temperature changes.

14. A control including a single bimetal strip means, snap-acting means connected to said strip means for causing said strip means to move with the snap-action, a control means connected to and operated by the movement of a portion of said single strip means, means including a first heating circuit under the control of said control means for heating said single strip means, an electrical means to be controlled connected to said first heating circuit, a second heating circuit portion including a second heating means extending closely along side a major portion of said single strip means having as its primary function the heating of said single strip means, said second electrical circuit portion being connected in parallel circuit relationship with the first heating circuit for supplying energy to the second heating means and for heating said single strip means, and a temperature responsive support means for said second heating means for moving the second heating means toward and away from the single strip means in accordance with temperature changes.

HARRY F. CLARK.

REFERENCES CITED

The following references are of record in the file of this patent:

UNITED STATES PATENTS

| Number | Name | Date |
|---|---|---|
| 1,743,053 | Traver | Jan. 7, 1930 |
| 1,893,223 | Burkle | Jan. 3, 1933 |
| 1,974,188 | Martin | Sept. 18, 1934 |
| 2,282,986 | Wood | May 12, 1942 |
| 2,379,602 | Stickel | July 3, 1945 |
| 2,447,488 | Clark | Aug. 24, 1948 |